(12) United States Patent
Numano

(10) Patent No.: US 7,057,606 B2
(45) Date of Patent: Jun. 6, 2006

(54) INFORMATION PROCESSING APPARATUS

(75) Inventor: Fujihito Numano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 470 days.

(21) Appl. No.: 10/352,923

(22) Filed: Jan. 29, 2003

(65) Prior Publication Data
US 2003/0160756 A1 Aug. 28, 2003

(30) Foreign Application Priority Data
Feb. 22, 2002 (JP) ............................. 2002-047221

(51) Int. Cl.
G09G 5/00 (2006.01)
(52) U.S. Cl. ...................... 345/173; 715/823; 715/825
(58) Field of Classification Search ................ 345/173; 178/18.01; 715/810, 825, 823
See application file for complete search history.

(56) References Cited

U.S. PATENT DOCUMENTS 5,250,929 A * 10/1993 Hoffman et al. ............ 715/823
6,560,612 B1 * 5/2003 Yamada et al. .......... 707/104.1

FOREIGN PATENT DOCUMENTS

| JP | 7-79462 | 3/1995 |
| JP | 08-044493 | 2/1996 |
| JP | 2000-181617 | 6/2000 |
| JP | 2000-339097 | 12/2000 |

OTHER PUBLICATIONS

Cowart, Robert, "Mastering Windows 3.1", 1993, pp. 151-155, 514-516.*

* cited by examiner

Primary Examiner—Kent Chang
(74) Attorney, Agent, or Firm—Finnegan, Henderson, Farabow, Garrett & Dunner, L.L.P.

(57) ABSTRACT

When a touch pad pointing device is tapped, the tapped position coordinate is detected and a predetermined function is performed based on the tapped coordinate. One of functions of a computer and a pointing function is allocated to a zone of the touch pad. When a zone of the touch pad is tapped, a notification based on the function allocated to the tapped zone is performed.

14 Claims, 8 Drawing Sheets

| COORDINATE | ZONE | FUNCTION | SOUND | ICON | BACKLIGHT COLOR |
|---|---|---|---|---|---|
| (Xa1, Ya1)-(Xa2, Ya2) | A | START MENU | SP-A | BMP-A | RED |
| (Xb1, Yb1)-(Xb2, Yb2) | B | FILE MENU | SP-B | BMP-B | BLUE |
| (Xc1, Yc1)-(Xc2, Yc2) | C | MAXIMIZE | SP-C | BMP-C | GREEN |
| (Xd1, Yd1)-(Xd2, Yd2) | D | MINIMIZE | SP-D | BMP-D | BLUE |
| (Xx1, Yx1)-(Xx2, Yx2) | X | ... | SP-X | BMP-X | YELLOW |
| (Xy1, Yy1)-(Xy2, Yy2) | Y | ... | SP-Y | BMP-Y | PURPUL |
| (Xz1, Yz1)-(Xz2, Yz2) | Z | SCROL BAR | SP-Z | BMP-Z | PINK |
| OTHER | - | MOUSE POINTING | NULL | NULL | NULL |
| LEFT BUTTON | - | LEFT CLICK | SP-L | NULL | NULL |
| RIGHT BUTTON | - | RIGHT CLICK | SP-R | NULL | NULL |
| MIDDLE BUTTON (not more than 1 sec) | - | MOUSE SETTING PROGRAM | SP-M | NULL | NULL |
| MIDDLE BUTTON (more than 1 sec) | - | FUNCTION CONFIRMATION SCREEN | SP-M | NULL | NULL |

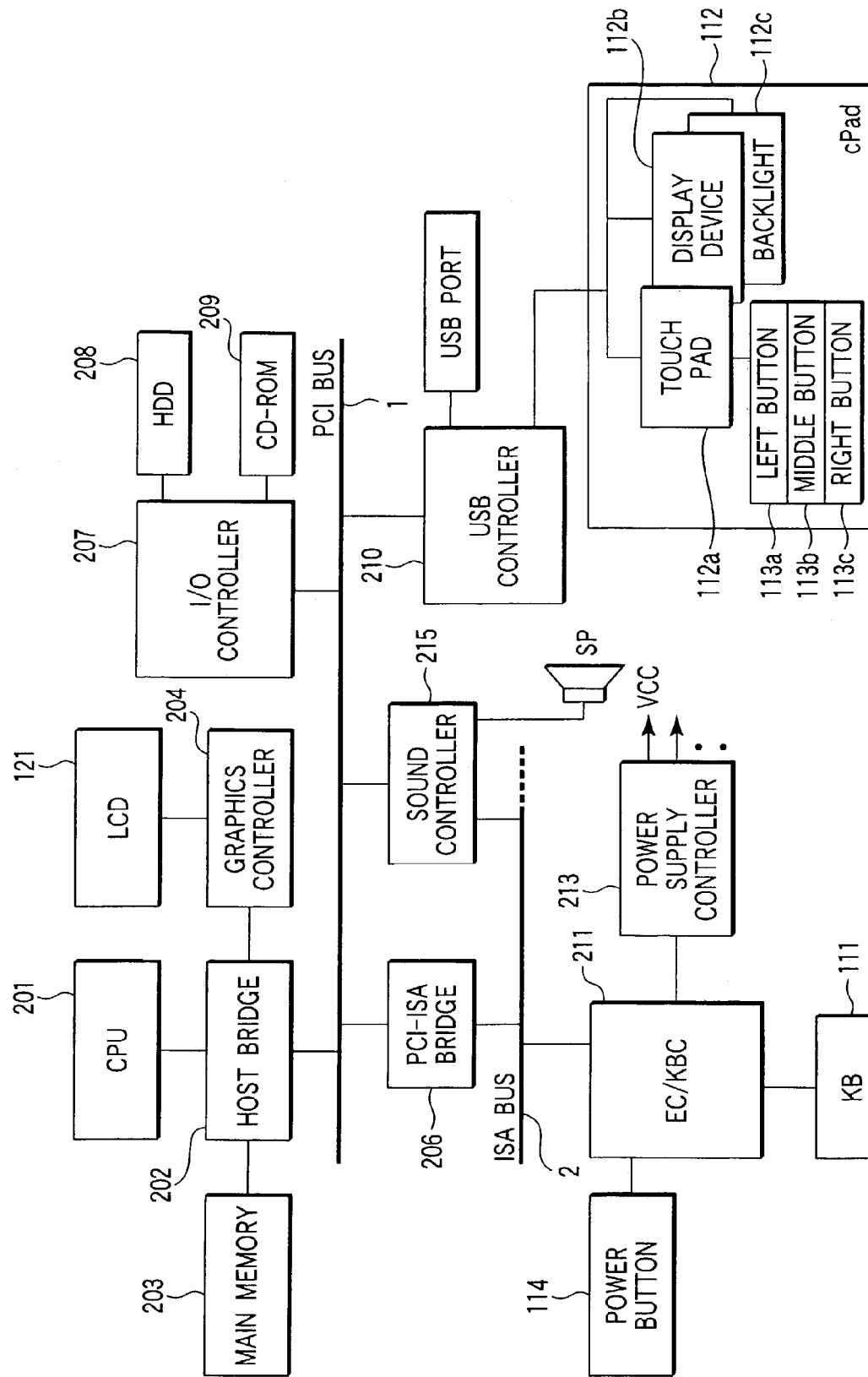
F I G. 2

| COORDINATE | ZONE | FUNCTION | SOUND | ICON | BACKLIGHT COLOR |
|---|---|---|---|---|---|
| (Xa1, Ya1)–(xa2, Ya2) | A | START MENU | SP-A | BMP-A | RED |
| (Xb1, Yb1)–(Xb2, Yb2) | B | FILE MENU | SP-B | BMP-B | BLUE |
| (Xc1, Yc1)–(Xc2, Yc2) | C | MAXIMIZE | SP-C | BMP-C | GREEN |
| (Xd1, Yd1)–(Xd2, Yd2) | D | MINIMIZE | SP-D | BMP-D | BLUE |
| (Xx1, Yx1)–(Xx2, Yx2) | X | ... | SP-X | BMP-X | YELLOW |
| (Xy1, Yy1)–(Xy2, Yy2) | Y | ... | SP-Y | BMP-Y | PURPUL |
| (Xz1, Yz1)–(Xz2,Yz2) | Z | SCROL BAR | SP-Z | BMP-Z | PINK |
| OTHER | - | MOUSE POINTING | NULL | NULL | NULL |
| LEFT BUTTON | - | LEFT CLICK | SP-L | NULL | NULL |
| RIGHT BUTTON | - | RIGHT CLICK | SP-R | NULL | NULL |
| MIDDLE BUTTON (not more than 1 sec) | - | MOUSE SETTING PROGRAM | SP-M | NULL | NULL |
| MIDDLE BUTTON (more than 1 sec) | - | FUNCTION CONFIRMATION SCREEN | SP-M | NULL | NULL |

FIG. 4

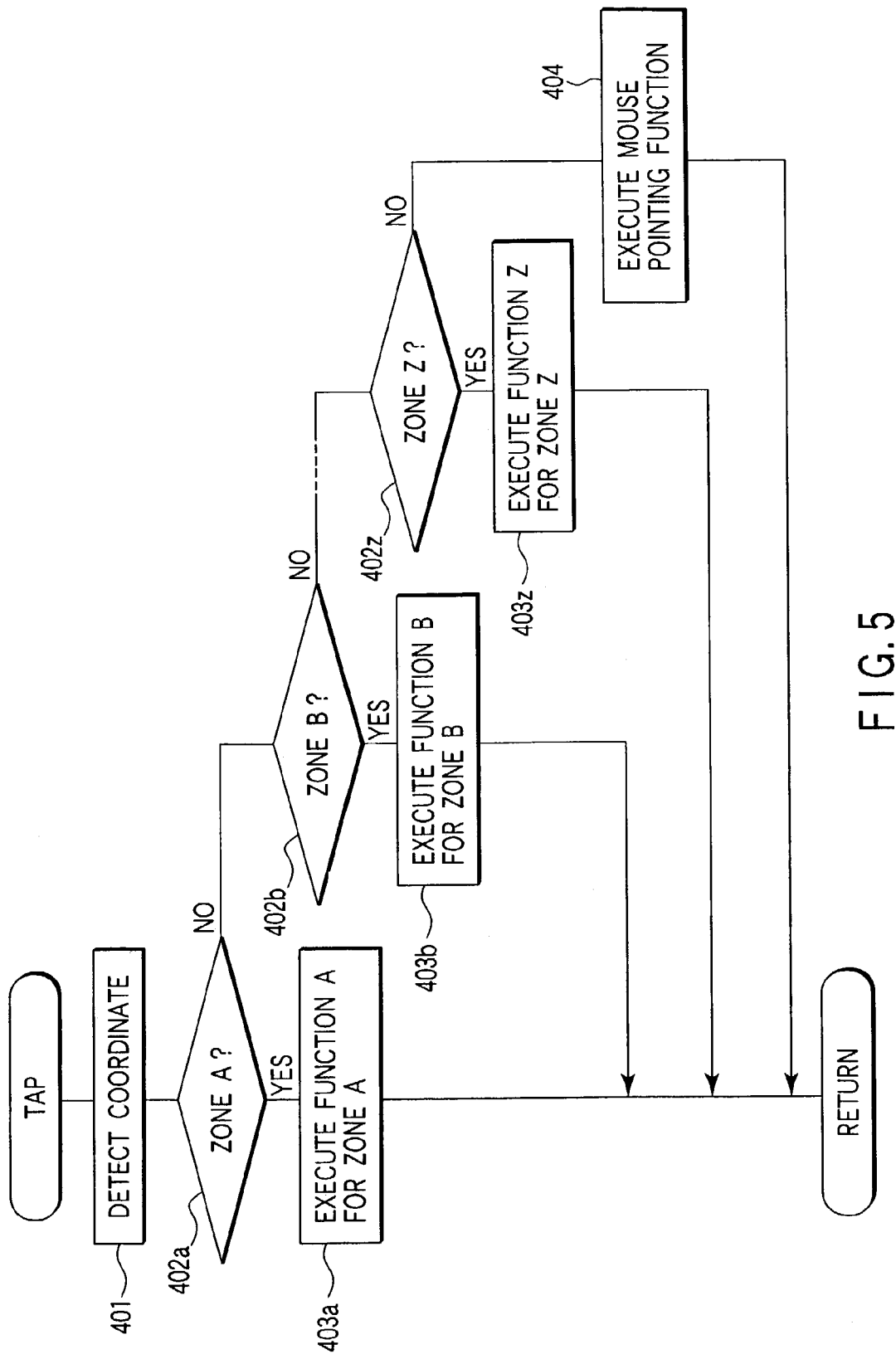
F I G. 5

INFORMATION PROCESSING APPARATUS

CROSS-REFERENCE TO RELATED APPLICATIONS

This application is based upon and claims the benefit of priority from the prior Japanese Patent Application No. 2002-047221, filed Feb. 22, 2002, the entire contents of which are incorporated herein by reference.

BACKGROUND OF THE INVENTION

1. Field of the Invention

The present invention relates to an information processing apparatus such as a portable personal computer equipped with, e.g., a touch pad pointing device.

2. Description of the Related Art

In recent years, there are developed various notebook or laptop portable personal computers. These types of portable personal computers are provided with various functions in order to assure improvement of the operationality.

An example of these functions is a pointing device for the portable computer as a replacement for a mouse. For example, the input unit pointing device disclosed in Jpn. Pat. Appln. KOKAI Publication No. 8-44493 is widely used as such type of pointing device. It is possible to give various commands to the computer by tapping tap zones on this touch pad. For example, the computer can be provided with commands for changing the speed of the mouse pointer indicated on a computer display device, defining the setup of above-mentioned tap zones, etc.

A utility for changing the mouse pointer speed is activated from the pointing device. In order to set the mouse pointer speed, a user calls a mouse setup screen, displays a pointer speed setup screen, and operates a slide bar on the screen. When the mouse pointer has been set to the slowest speed, however, the user needs to perform the whole operation using the slowest mouse pointer, degrading the operationality.

The user needs to display a tap zone confirmation screen in the display screen on the display device each time he or she wishes to confirm the defined tap zone function. It has been difficult to confirm the defined function.

The prior art requires much time and labor for various settings and operations on the computer's setup and operation screens, causing problems of operationality and workability.

BRIEF SUMMARY OF THE INVENTION

An embodiment of the present invention may provide an information processing apparatus capable of easily carrying out various settings and operations on the setup and operation screens.

According to an embodiment of the present invention, an information processing apparatus comprises an information processing unit having functions; a display which displays a processing result of the information processing unit; an input unit which has a pointing function for specifying a position on the display; a function allocating unit configured to allocate one of the functions of the information processing unit and the pointing function to a zone of the input unit; and a notice unit configured to perform, when a zone of the input unit is tapped, a notification based on the function allocated to the tapped zone.

According to another embodiment of the present invention, an operation assistance method for an information processing apparatus comprising an information processing unit having functions, a display which displays a processing result of the information processing unit, and an input unit which has a pointing function for specifying a position on the display, the method comprises allocating one of the functions of the information processing unit and the pointing function to a zone of the input unit; and performing, when a zone of the input unit is tapped, a notification based on the function allocated to the tapped zone.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is a block diagram showing a hardware configuration of the personal computer according to the embodiment;

FIG. 4 shows a configuration example of a setup table;

FIG. 5 is a flowchart showing a control program procedure;

DETAILED DESCRIPTION OF THE INVENTION

An embodiment of an information processing apparatus according to the present invention will now be described with reference to the accompanying drawings.

First Embodiment

As the embodiment, the following describes a personal computer having not only a display device (main device) for displaying text, graphics, a mouse pointer, etc., but also a display-equipped pointing device integrally comprising a display panel (sub display) such as an LCD and a touch pad. The display of this pointing device enables to setup and manipulate various setup and operation screens. As an example of display-equipped pointing devices, there is available "cpad" (registered trademark) by Synaptics, Inc. (see http://www.synaptics.com/products/cpad.cfm).

Figure 1:
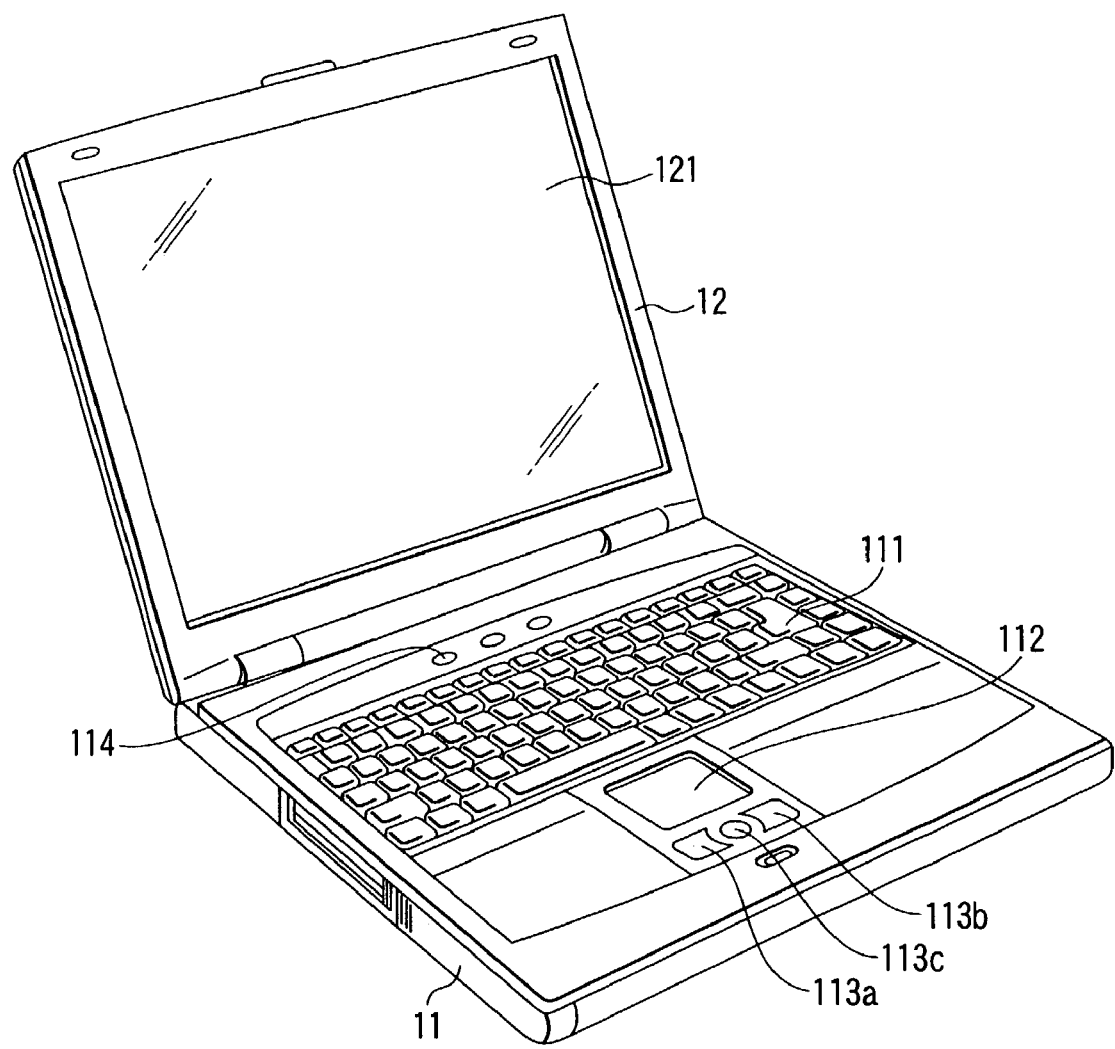
FIG. 1 is a perspective view showing an external configuration of a personal computer according to an embodiment of the present invention.

FIG. 1 is a perspective view showing an external configuration of an information processing apparatus according to the first embodiment. Here is presented a notebook personal computer as an example.

As shown in. FIG. 1, the computer according to the first embodiment comprises a computer body 11 and a display unit 12. The display unit 12 includes a display screen (main display) 121 comprising an LCD. The display unit 12 is freely rotatively mounted on the computer body 11 between open and close positions. The computer body 11 is formed like a thin box case. A keyboard 111 is arranged on the top surface of the case. An armrest is formed on this top surface between the keyboard 111 and the front end of the case. Almost at the center of the armrest, a display-equipped, touch pad pointing device 112 is arranged together with a left button 113a, a right button 113b, and a middle button 113c that are included in the device 112. The device 112 also works as a sub display.

Further, on the top surface of the computer body 11, there is provided a power button 114 to turn on or off the computer body 11.

FIG. 2 is a block diagram showing a system configuration of the computer illustrated in FIG. 1. As shown in FIG. 2, the computer comprises a CPU 201, a host bridge 202, a main memory 203, a graphics controller 204, a PCI-ISA (Peripheral Component Interconnect-Industry Standard Architecture) bridge 206, an I/O (Input/Output) controller 207, a hard disk drive (HDD) 208, a CD-ROM (Compact Disk-Read Only Memory) drive 209, a USB (Universal Serial Bus) controller 210, an embedded controller and keyboard controller IC (EC/KBC) 211, and a power supply controller 213, and the like.

The pointing device 112 and a USB port 228 are connected to the USB controller 210. The pointing device 112 integrally comprises a touch pad 112a, a display device 112b, and a backlight 112c, and includes the left button 113a, the right button 113b, and the middle button 113c.

The CPU 201 controls computer operations and executes an operating system, application programs, and utility programs loaded into the main memory 203 from the hard disk drive 208. The embodiment executes programs shown in FIG. 4. Processing of these programs in FIG. 4 will be described later.

The host bridge 202 is a bridge device to make bidirectional connection between a local bus (not shown) of the CPU 201 and a PCI bus 1. The graphics controller 204 controls a main display (Liquid Crystal Display) 121 used as a display monitor for the computer. The I/O controller 207 controls the hard disk drive 208, the CD-ROM drive 209, and the like. The PCI-ISA bridge 206 is a bridge device to make bidirectional connection between the PCI bus 1 and an ISA bus 2. In this example, the PCI-ISA bridge 206 includes various system devices such as a system timer, a DMA controller, an interrupt controller, and the like.

The embedded controller and keyboard controller IC (EC/KBC) 211 is a one-chip microcomputer integrating an embedded controller (EC) for power management and a keyboard controller (KBC) for controlling the keyboard 111. The embedded controller and keyboard controller IC (EC/KBC) 211 turns on or off the computer in cooperation with the power supply controller 213 in response to a user operation of the power button 114.

Figure 3:
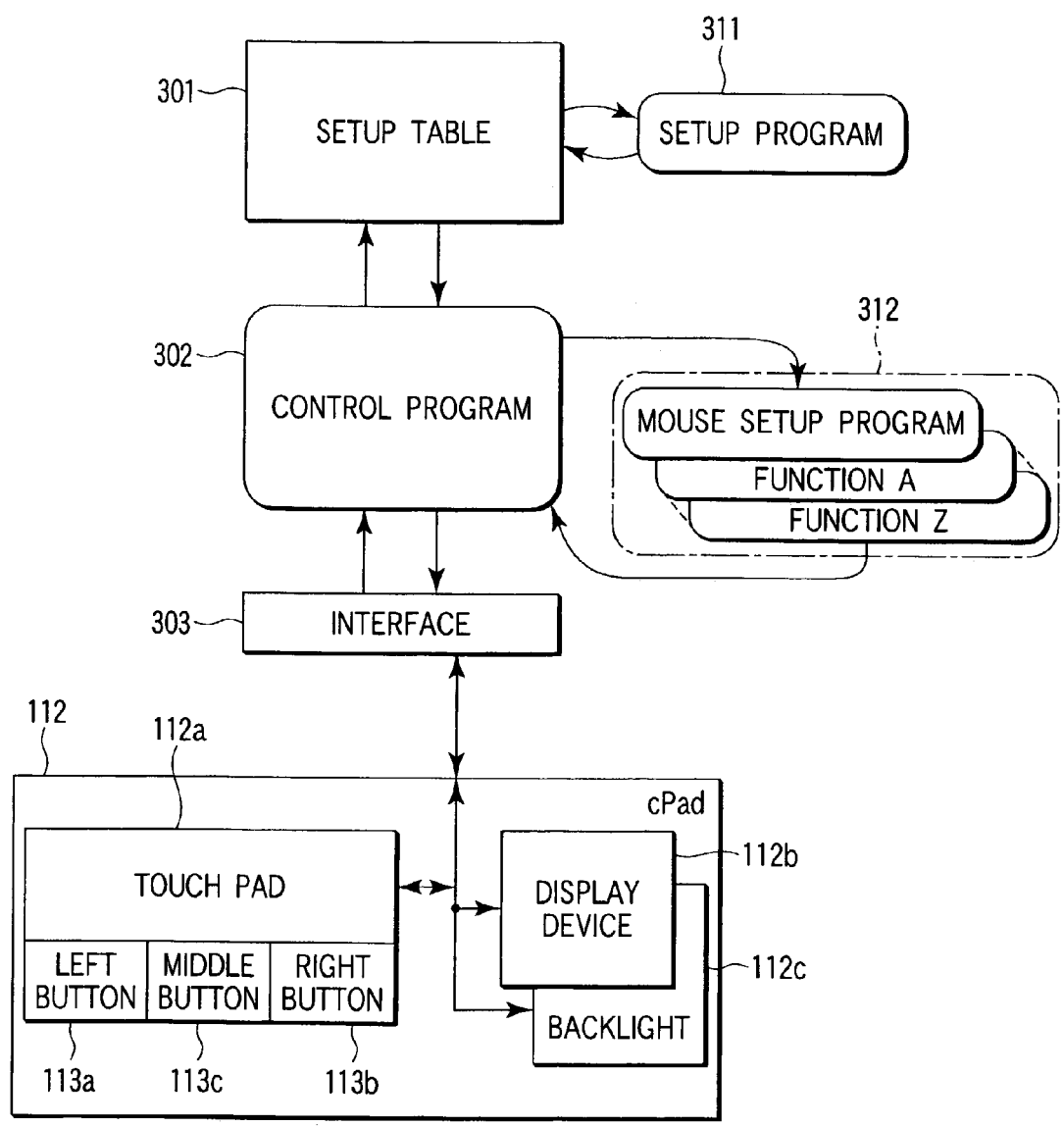
FIG. 3 is a functional block diagram showing a main part of the embodiment.

FIG. 3 is a block diagram showing components of the main part according to the first embodiment. The components include a setup table 301 for setting up functions of the pointing device 112; a control program 302 for controlling functions of the pointing device 112 according to contents of the setup table 301; an interface 303 for controlling input and output of information interchanged between the pointing device 112 and the control program 302; a setup program 311 for configuring the setup table 301 based on GUI; an execution unit 312 for executing a mouse setup function and functions A through Z in accordance with commands of the control program 302; and the pointing device 112.

FIG. 4 exemplifies a configuration of the setup table 301. This table is capable of setting sounds, icons (bit map images), and backlight colors for setup areas such as the tap zone, a scroll bar zone, etc., and the remaining zone (pointing zone). Functions and sounds are also configured for the left button 113a, the right button 113b, and the middle button 113c. A user can freely configure the setup table 301 using the GUI function by executing the setup program 311. The setup table 301 is customizable for each user.

In this example, the mouse pointing zone corresponds to a zone not configured in the setup table 301, i.e., the zone except the tap zone on the pointing device 112. It is also possible to freely specify sounds and the like for the mouse pointing zone. A user can easily identify the most recently setup mouse pointing functions and other functions on the pointing device 112. This enables smooth input/output operations for the pointing device 112. The zone not defined in the setup table 301 uniquely works as the mouse pointing zone, facilitating configuration of the setup table 301 and improving the usability. Since sounds can be defined for button operations, the user can audibly confirm button operations.

FIG. 5 is a flowchart showing a procedure of the control program 302 according to the first embodiment. The program is executed in accordance with tapping on the pointing device 112. When the pointing device 112 is tapped, the control program 302 recognizes the tapped coordinate (step 401). If the coordinate is within value zones specified in the setup table 301 (YES at steps 402a through 402z), the program executes functions for the zones specified in the setup table 301 (steps 403a through 403z). If the coordinate is outside the specified value zones, the program executes the mouse pointing function (step 404).

In this manner, the functions defined in the setup table 301 are executed when the tapped coordinate is within the zones specified in the setup table 301. The pointing function is simply executed like a conventional mouse when the tapped coordinate is outside the zones specified in the setup table 301.

Figure 6:
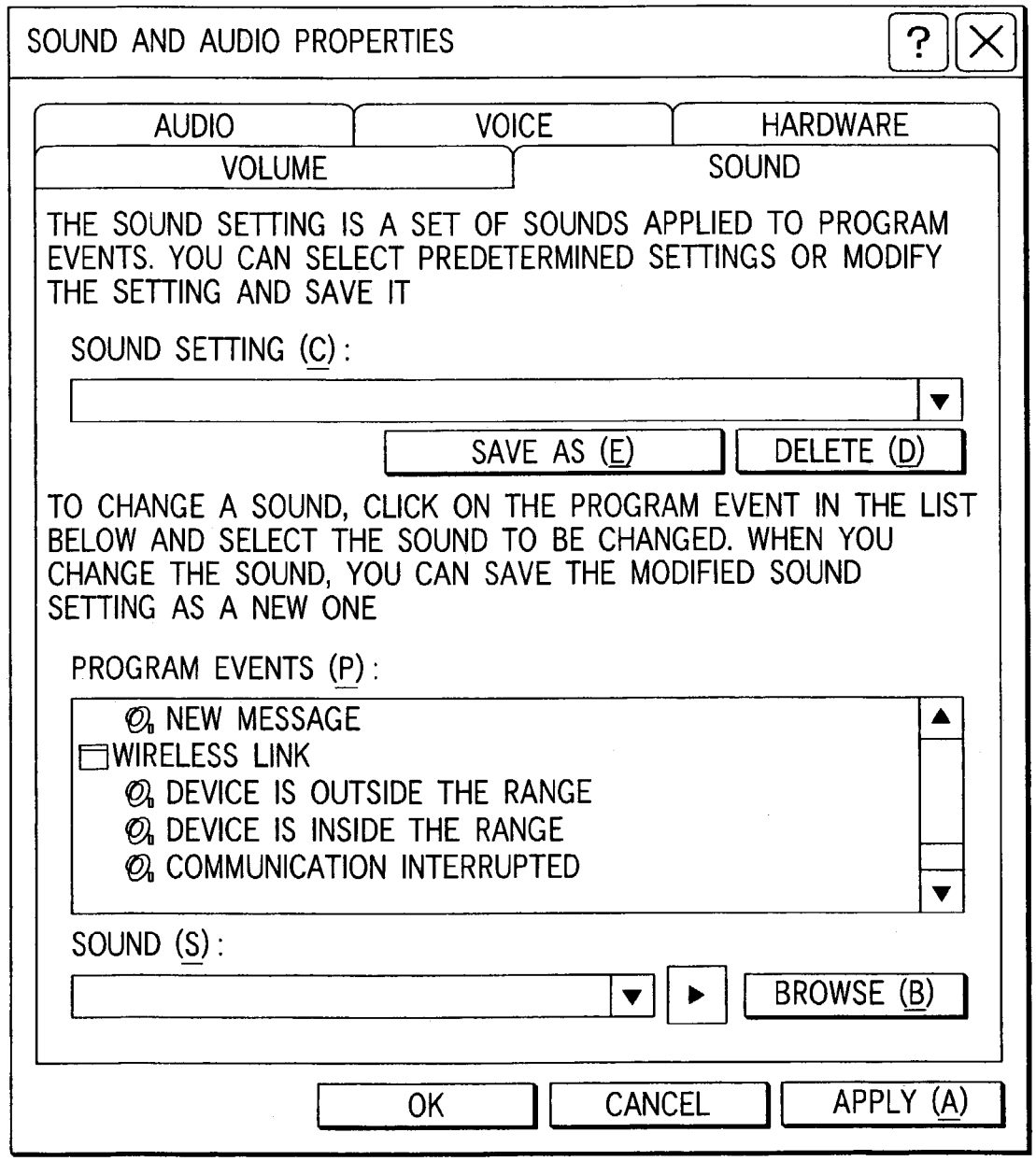
FIG. 6 shows a property setting screen for a sound and an audio device.
Figure 7:
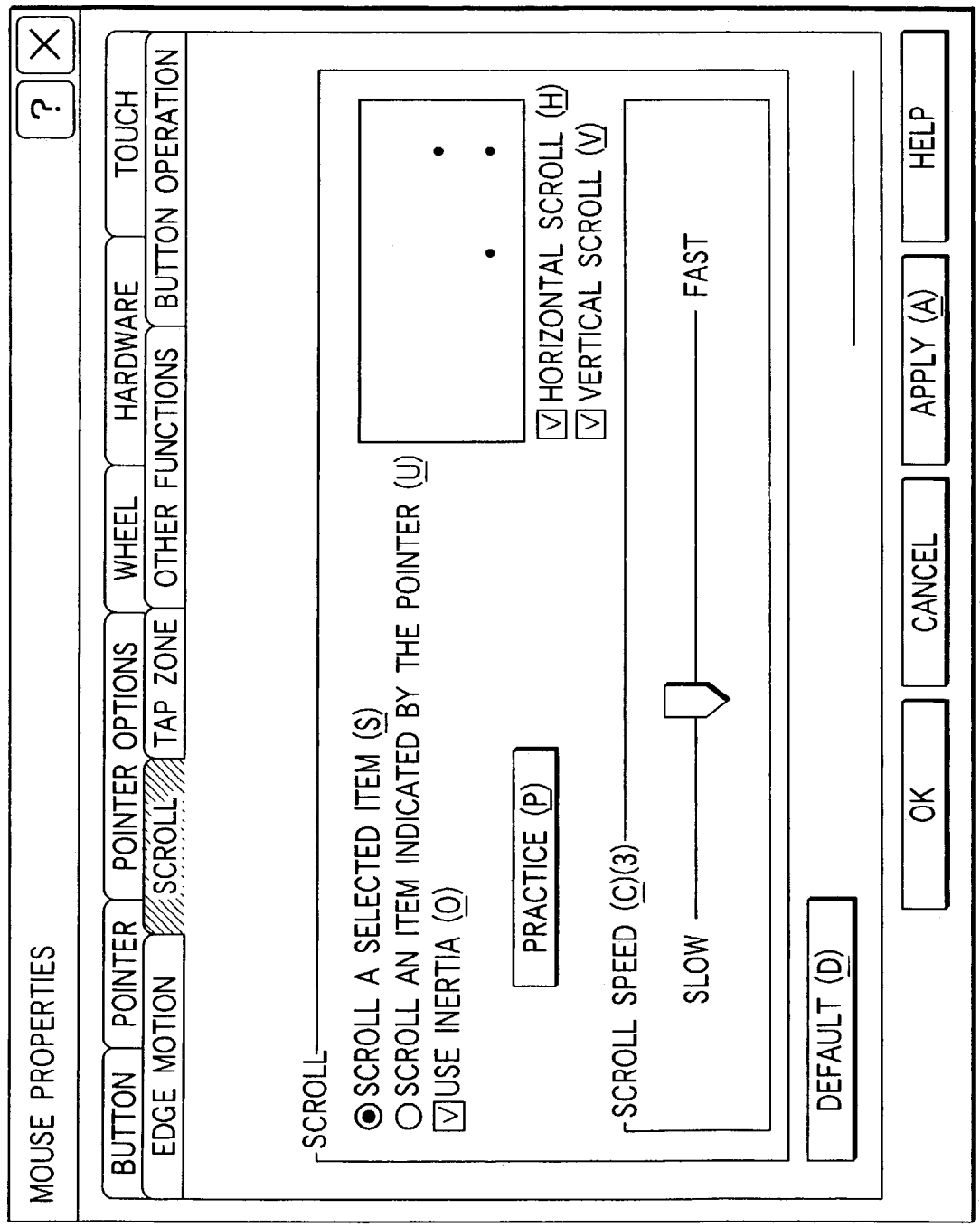
FIG. 7 shows a property setting screen for a scroll function provided as an additional operation function to the pointing function.
Figure 8:
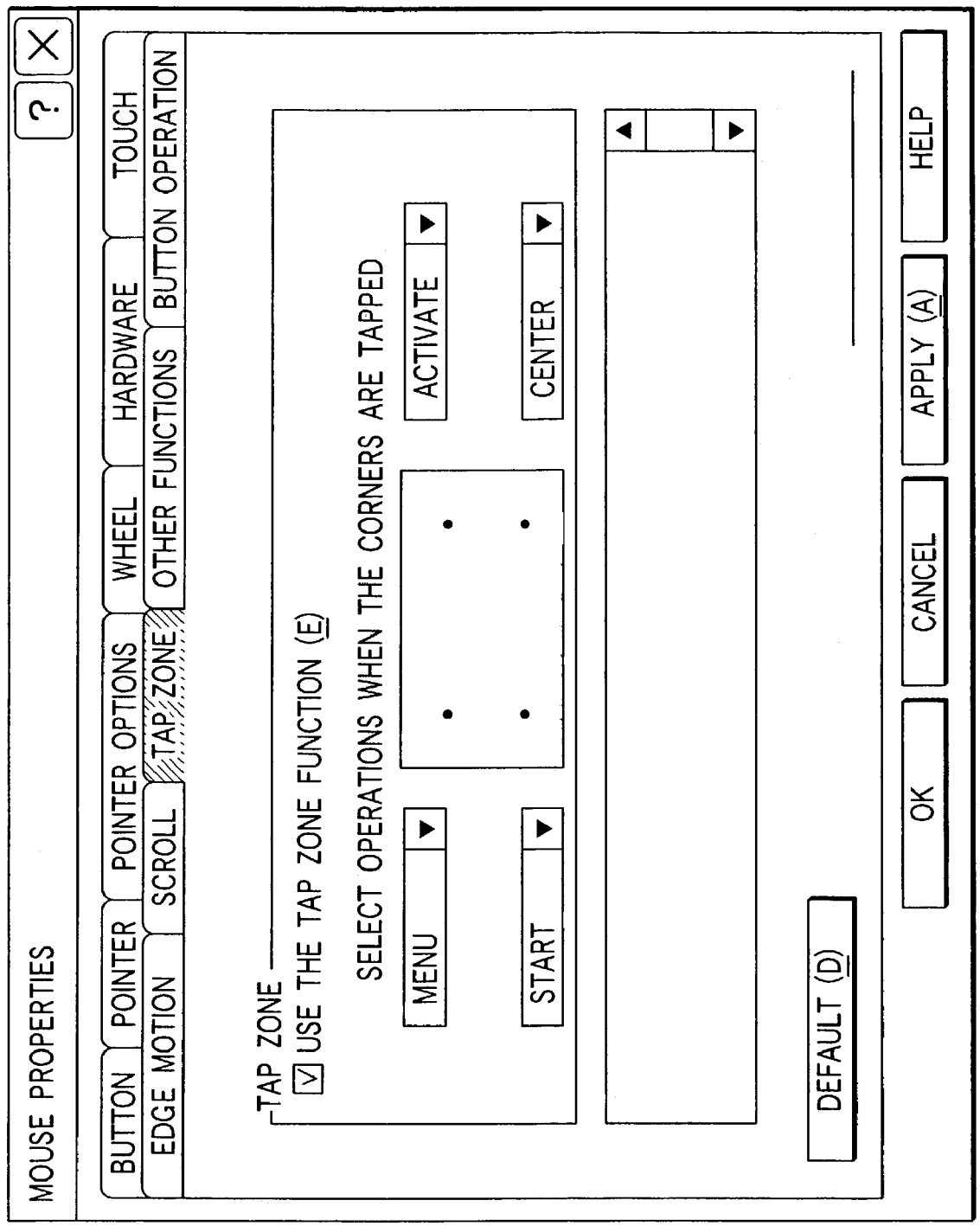
FIG. 8 shows a property setting screen for tap zones provided as an additional operation function to the pointing function.

FIGS. 6 to 8 show setup screens capable of setting various functions of the pointing device 112 in the setup table 301. FIG. 6 shows a property setting screen for a sound and an audio device. FIG. 7 shows a property setting screen for a scroll function provided as an additional operation function to the pointing function. FIG. 8 shows a property setting screen for tap zones provided as an additional operation function to the pointing function.

The following describes operations of a function that uses the sound to notify the operation functions of the pointing device 112.

For example, the property setting screen as shown in FIG. 6 can be used to define the sound in the setup table 301. When a user operates the pointing device 112, the defined sound helps the user easily and reliably determine whether that operation is associated with the pointing function or with the other functions. For this setup operation, it may be preferable to use not only the pointing device 112, but also the other input devices such as the keyboard 111, the mouse, and the like.

When the pointing device 112 is tapped, the control program 302 recognizes the tapped coordinate (step 401 in FIG. 5). If the tapped coordinate is within the area specified in the setup table 301 (YES at steps 402a to 402z in FIG. 5), the program executes the function specified in setup table 301 (steps 403a to 403z in FIG. 5). As shown in FIG. 4, for example, the sound setting in the setup table 301 specifies "Null" for the pointing zone (zones not specified in FIG. 4) and "SP-A" for the tap zone "A." When the user uses the pointing device 112 to operate the tap zone "A" ((Xa1, Ya1)

trough (Xa2, Ya2)) specified in the setup table 301, the control program 302 uses the execution unit 312 to generate sound "SP-A." When the user operates a zone not defined in the setup table 301, the control program 302 recognizes the mouse pointing function. Since the setup table 301 specifies "Null" for the pointing function, no sound is generated. In this case, the execution unit 312 activates no sound output.

Consequently, when an operation on the pointing device 112 causes the pointing function, no sound is generated. When an operation does not correspond to the pointing function specified in the setup table 301, the speaker SP generates the sound specified for the operated zone. In this manner, there is provided a notification function for operation contents by means of sound, decreasing user's visual load and enabling error-free and smooth tapping.

The setup table 301 can be created for each user. When the system starts thereafter, a user authentication function is used to provide the sound notification function specific to each user.

As mentioned above, it is possible to provide a mechanism that can assign different sounds for users to the pointing and other operations on the pointing device 112. By hearing the sound while operating the pointing device 112, the user can immediately determine whether the pointing or another operation is performed at the instant of that operation. By hearing the user-specified sound, the user can immediately determine whether or not the user's own environment takes effect at the instant of that operation.

The sound notification function can be temporarily turned off (muted), because it may be inconvenient if this notification function is always activated. To temporarily disable the sound effect at any time, for example, there is provided a function that entirely or partly disables the sound setting in the setup table 301 referenced by the control program 302 in response to a press of a predetermined button, e.g., the middle button 113b until the next press thereof. In a situation where generating the sound is inconvenient, for example, the sound can be muted temporarily with an easy operation. When the sound effect is inconvenient during reproduction of a media, for example, the touch pad's sound effect can be disabled temporarily.

The description so far concerns the sound notification function. It is possible to display operation functions of the pointing device 112 with icons by controlling the display section 112b of the pointing device 112. The following describes operations concerned.

The setup table 301 in FIG. 4 can be used to define an icon (e.g., graphical image, character image, or the like) so that the icon can easily and uniquely represent a user's operation on the pointing device 112 in response to that action, indicating whether the operation is associated with the pointing function or other functions.

When the pointing device 112 is tapped, the control program 302 recognizes the tapped coordinate (step 401 in FIG. 5). If the tapped coordinate is within the areas specified in the setup table 301 (YES at steps 402a through 402z in FIG. 5), the control program 302 executes the functions defined in the setup table 301 (steps 403a through 403z in FIG. 5). In this case, for example, it is assumed that the display settings of the setup table 301 contain "Null" for the pointing function and "bmp-A" for the tap zone A as shown in FIG. 4. When the user operates the tap zone A ((Xa1, Ya1) through (Xa2, Ya2)) defined in the setup table 301 on the pointing device 112, the control program 302 allows the execution unit 312 to display "bmp-A". If the tapped coordinate is outside the areas defined in the setup table 301, the control program 302 identifies the mouse pointing function and displays no icons because the setup table 301 defines "Null" for the pointing function.

Accordingly, when an operation on the pointing device 112 corresponds to the pointing function, no icons appear on the display section 112b. When an operation on the pointing device 112 does not correspond to the pointing function defined in the setup table 301, the display section 112b shows an icon defined for the tapped zone. Since there is provided the icon-based notification function for operation contents, operations for the corresponding functions can be confirmed on the pointing device 112, allowing error-free, smooth tapping.

The setup table 301 can be created for each user. When the system starts thereafter and the user authentication function is performed, each user can be provided with the specific display notification function through the pointing device 112.

As mentioned above, at the instant of any operation on the pointing device 112, the user can determine whether or not that operation corresponds to the pointing operation by confirming the display on the pointing device 112. For example, when a medium is reproduced on the main display 121 of the computer, especially, when an image is displayed on the entire screen, the display device 112b of the pointing device 112 can be used to notify the operation function of the pointing device 112 without affecting the contents of the main display 121. Further, by confirming the changed indication, the user can immediately determine whether or not the user's own environment takes effect at the instant of that operation.

Like the sound notification function, the icon-based notification function can be temporarily disabled. To temporarily disable the icon display at any time, for example, there is provided a function that entirely or partly disables the icon setting in the setup table 301 referenced by the control program 302 in response to a press of a predetermined button, e.g., the middle button 113b until the next press thereof.

Further, it is possible to display operation functions of the pointing device 112 by coloring the backlight 112c of the display section 112b of the pointing device 112, as shown in FIG. 4.

The following describes operations of a function to use the backlight 112c of the pointing device 112 for notifying operation functions of the pointing device 112.

The setup table 301 in FIG. 4 can be used to define indication states of the backlight 112c (e.g., light colors, brightness, blinking and the like) so that the backlight 112c can easily and uniquely represent a user's operation on the pointing device 112 in response to that action, indicating whether the operation is associated with the pointing function or other functions. While FIG. 4 sets only backlight colors, the other indication modes such as brightness, blinking, etc. can be also set.

When the pointing device 112 is tapped, the control program 302 recognizes the tapped coordinate (step 401 in FIG. 5). If the tapped coordinate is within the areas specified in the setup table 301 (YES at steps 402a through 402z in FIG. 5), the control program 302 executes the functions defined in the setup table 301 (YES at steps 403a through 403z in FIG. 5). In this case, for example, it is assumed that the display settings of the setup table 301 contain "Null" for the pointing function and "RED" for the tap zone A as shown in FIG. 4. When the user operates the tap zone A ((Xa1, Ya1) through (Xa2, and Ya2)) defined in the setup table 301 on the pointing device 112, the control program 302 allows the execution unit 312 to display "RED." If the tapped coordinate is outside the areas defined in the setup table 301, the control program 302 identifies the mouse pointing function and keeps the state of the backlight 112c unchanged because the setup table 301 defines "Null" for the pointing function.

Accordingly, when an operation on the pointing device 112 corresponds to the pointing function, the pointing device 112 is subject to no changes in its display state. When an operation on the pointing device 112 does not correspond to the pointing function, the indication state is changed in accordance with the backlight's indication state defined for the operated area. Since there is provided the notification function for operation contents by updating the backlight indication states, operations for the corresponding functions can be confirmed on the pointing device 112, allowing error-free, smooth tapping.

The setup table 301 can be created for each user. When the system starts thereafter and the user authentication function is performed, each user can be provided with the specific display notification function through the pointing device 112.

As mentioned above, at the instant of any operation on the pointing device 112, the user can determine whether or not that operation corresponds to the pointing operation by confirming the indication state of the backlight 112c provided for the pointing device 112. Further, by confirming the changed indication, the user can immediately determine whether or not the user's own environment takes effect at the instant of that operation.

While the above-mentioned embodiment describes the display-equipped pointing device, the present invention is also applicable to the other pointing devices simply comprising touch pads if the setup table 301 does not include an icon and a backlight color. Moreover, the present invention is not limited to the table structure, screen configurations, setup functions and the like as shown in the figures of this embodiment but may be otherwise variously embodied in accordance with system functions, specifications and the like.

According to the present invention, as mentioned above in detail, the information processing apparatus equipped with the touch pad apparatus can provide the method of supporting operations of the information processing apparatus and the computer capable of easily and reliably determining whether or not an operation on the touch pad apparatus corresponds to the pointing function in response to that operation.

Further, by effectively using the existing sound function of the apparatus, the display function of the touch pad apparatus, the backlight function and the like, the present invention can provide the method of supporting operations of the information processing apparatus and the computer capable of easily and reliably determining whether or not an operation on the touch pad apparatus corresponds to the pointing function in response to that operation.

What is claimed is:

1. An information processing apparatus comprising:
   an information processing unit having functions;
   a display that displays a processing result of the information processing unit;
   an input unit that has a touch panel including a pointing zone for specifying a point on the display and function selecting zones for selecting one of the functions of the information processing unit;
   a function executing unit configured to execute one of the functions selected by the touch panel;
   a pointing unit that displays a cursor at a point on the display specified by the touch panel; and
   a notice unit configured to perform, when one of the function selecting zones touched, a notification.

2. The information processing apparatus according to claim 1, wherein the notice unit generates different sounds depending on the tapped function selecting zone.

3. The information processing apparatus according to claim 2, wherein the notice unit generates a sound specified for each user.

4. The information processing apparatus according to claim 1, wherein
   the input unit has a second display; and
   the notice unit displays an icon on the second display depending on the touched function selecting zone.

5. The information processing apparatus according to claim 4, wherein the notice unit displays an icon specified for each user.

6. The information processing apparatus according to claim 1, wherein
   the input unit has a second display with a backlight; and
   the notice unit emits a backlight of a color depending on the touched function selecting zone.

7. The information processing apparatus according to claim 6, wherein the notice unit emits a backlight of a color specified for each user.

8. The information processing apparatus according to claim 1, wherein the function executing unit comprises a table defining functions allocated to zones and notification actions for the zones which are activated when the zones are touched.

9. The information processing apparatus according to claim 8, wherein the notification actions are temporary disabled upon a predetermined operation by a user.

10. The information processing apparatus according to claim 8, wherein the notification actions comprise a generation of a sound and a display of an icon.

11. The information processing apparatus according to claim 1, further comprising:
    an interrupting unit configured to interrupt an operation of the notice unit.

12. An operation assistance method for an information processing apparatus comprising an information processing unit having functions, a display which displays a processing result of the information processing unit, and an input unit that has a touch panel including a pointing zone for specifying a point on the display and function selecting zones for selecting one of the functions of the information processing unit, the method comprising:
    executing one of the functions selected by the input unit;
    displaying a cursor at a point on the display specified by the input unit; and
    performing, when one of the function selecting zones of the input unit is touched, a notification.

13. The method according to claim 12, wherein the performing comprises performing different notifications for each user.

14. The method according to claim 12, wherein the performing comprises generating different sounds depending on the touched function selecting zone.

* * * * *

UNITED STATES PATENT AND TRADEMARK OFFICE
CERTIFICATE OF CORRECTION

PATENT NO.        : 7,057,606 B2                                    Page 1 of 1
APPLICATION NO.   : 10/352923
DATED             : June 6, 2006
INVENTOR(S)       : Numano It is certified that error appears in the above-identified patent and that said Letters Patent is hereby corrected as shown below:

Claim 1, column 8, line 4, change "zones touched," to --zones is touched--.

Signed and Sealed this

Eighth Day of August, 2006

JON W. DUDAS
*Director of the United States Patent and Trademark Office*